United States Patent [19]
Nielsen

[11] 3,890,713
[45] June 24, 1975

[54] DENTAL DEVICES

[76] Inventor: Nils Villadsen Nielsen, Sdr. Hallundbaek, Hodsager, Holstebro, Denmark

[22] Filed: Sept. 25, 1973

[21] Appl. No.: 400,654

[30] Foreign Application Priority Data

Sept. 27, 1972 United Kingdom............44594/72

[52] U.S. Cl. .................................................. 32/60
[51] Int. Cl. ............................................ A61c 5/04
[58] Field of Search ...................... 32/60, 52, 53, 54

[56] References Cited
UNITED STATES PATENTS
3,521,356  7/1970  Newman................................ 32/60
3,623,224  11/1971  Smith..................................... 32/60

*Primary Examiner*—Robert Peshock
*Attorney, Agent, or Firm*—Craig & Antonelli

[57] ABSTRACT

A dental implement for use in connection with filling of tooth cavities with amalgam or a similar tooth filling material, characterized in that it is made as a hand tool having a narrow outlet spout for amalgam and an amalgam container communicating with the spout for dispensing amalgam therethrough, and a vibrator unit serving to vibrate a tool part by means of which the amalgam in the cavity can be compressed or condensed. In the outlet spout there is mounted a plunger or hammar element connected to a vibrator and serving to push the filling material into the tooth cavity in a beat like manner with a relatively high working frequency, e.g. 500 cycles per minute, whereby it is possible to rapidly fill the cavity with many small portions of the filling material and with positive compression or condensation of each of these portions. The advantage of using the device is not only a considerable saving of work but also that in practice it becomes possible to fill the tooth cavity according to the so-called "wet" method whereby a filling of a highly improved quality is obtainable.

15 Claims, 9 Drawing Figures

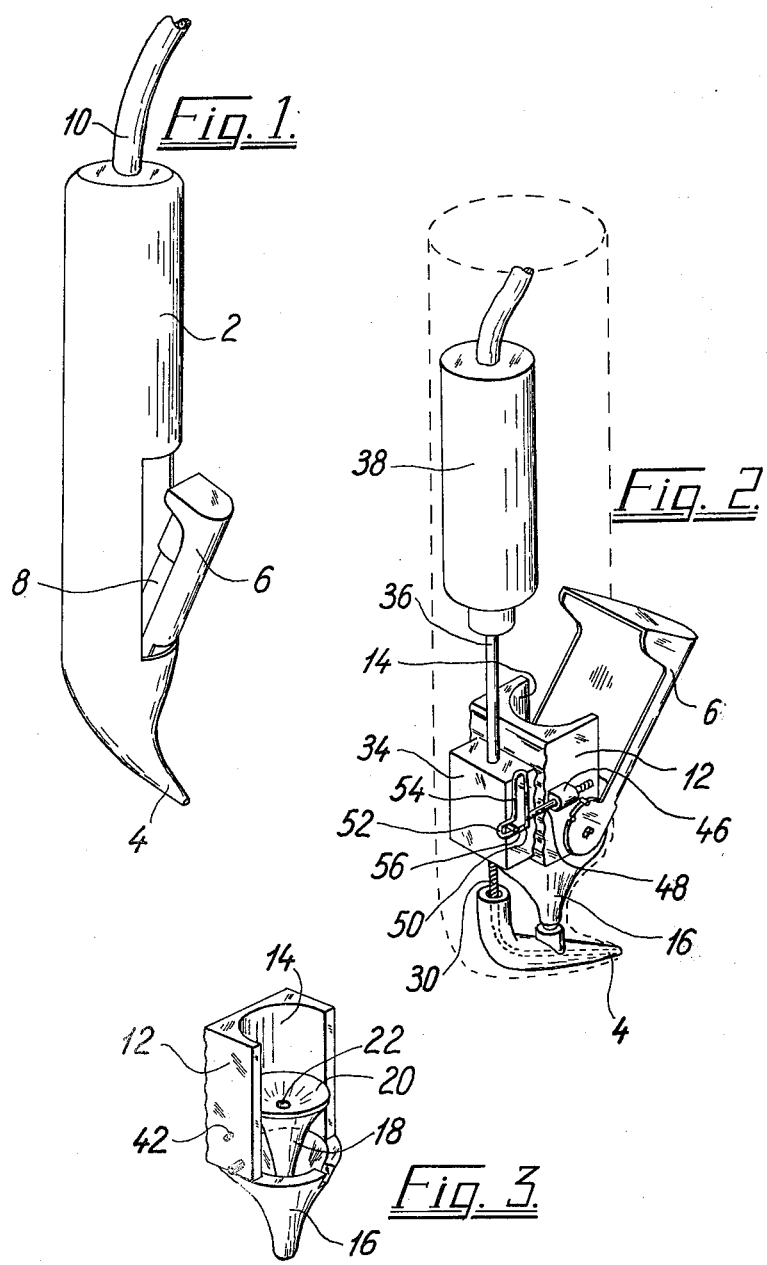

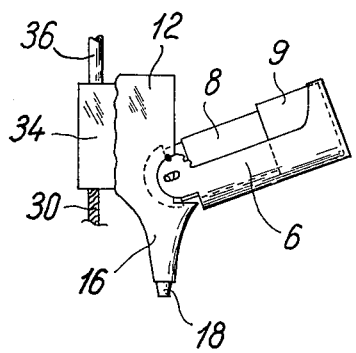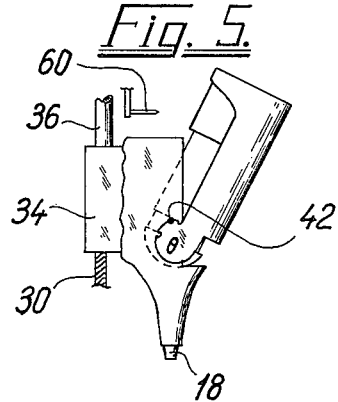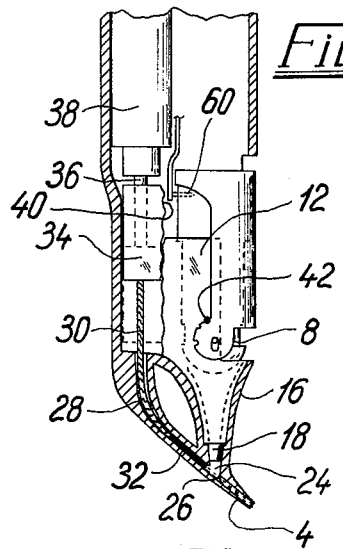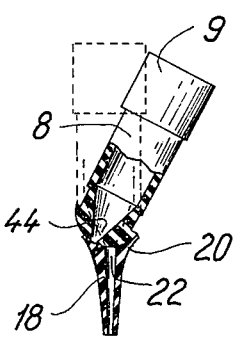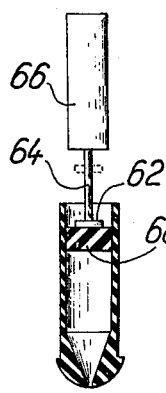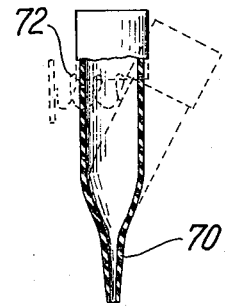

DENTAL DEVICES

The present invention relates to a dental implement for use in connection with filling of tooth cavities with amalgam or a similar tooth filling material.

With most dentists the amalgam or similar material is prepared manually by an assistant who mixes measured quantities of the material coponents such as mercury and a compound of silver and zinc powder, also called the "filing," in a mortar. This work is laborious and time-consuming and the ready made amalgam shall be used rather rapidly.

Mixing machines are known in which the components can be placed and mixed by automatic shaking. The components are supplied in factory made cartridges in which they are contained in the correct mutual proportion in two mutually separated chambers between which there is provided a partition which is breakable from outside. This partition is broken before a cartridge is placed in the machine, and after the shaking the ready mixed amalgam portion can be taken out from the cartridge. These machines, of course, are advantageous as far as preparation of the amalgam is concerned, but they do not help the dentist in his own work of carrying out the actual tooth filling.

In the actual filling work the assistant normally places a small amount of amalgam on the point of a filling tool which is handed over to the dentist, who fills the amalgam into the tooth cavity, this operation being repeated several times, since in each operation only a limited amount of amalgam should be transferred to the cavity. It is essential that the amalgam is compressed or condensed in the cavity in small portions, and this compression is done from time to time during the filling by the dentist compressing the material manually by means of a hand pressing tool or by means of a tiny hammer element mounted on the hand piece of the dentist's drilling machine. For the carrying out of this work it is unimportant whether the amalgam has been prepared manually or automatically.

It is the purpose of this invention to provide an implement which can facilitate the filling work by making superfluous the repeated overhandings of amalgam portions from an assistant and the repeated interruptions of the filling for effecting the compression or condensing of the material.

According to the invention there is provided a dental implement made as a hand tool having a narrow outlet spout for amalgam or the like and an amalgam container communicating with the spout for dispensing amalgam therethrough, and a vibrator unit serving to vibrate a tool part by means of which the amalgam in the cavity can be compressed. Hereby the necessary reservoir of amalgam will be situated in the hand tool itself, and the amalgam can be supplied to the tooth through the narrow outlet spout and in the necessary amounts. Since the tool is provided with a vibrator the compression can be effected in a practically uninterrupted manner, so the dentist can do the entire work without laying the tool and without needing an assistant for the handing-over of the amalgam.

In a preferred embodiment of the invention there is mounted in the outlet spout a reciprocal plunger operatively connected with the vibrator so as to be reciprocated between a retracted position in which it uncovers a side opening in the spout through which the spout communicates with the amalgam container, and an advanced position in which it covers the side opening and in which the front end thereof is situated close to the outer end of the spout. The said plunger will serve to advance the amalgam to the tooth cavity and it will automatically cause every little portions of amalgam to be compressed, i.e. the compression or condensation will automatically take place in an optimal manner. The filling of the tooth with quite small amalgam portions, which are applied rapidly after each other and immediately compressed in an effective manner, involves some very important advantages beyond the mere labour saving, since it becomes possible to satisfy practically all demands to a filling of a high quality, this being difficult or impossible by the usual manual fillings. In this connection there should not be given any longer scientific explanation concerning the filling conditions, but it should be mentioned as a very essential feature that with the use of the tool according to the invention it is possible to use the so-called "wet" filling method, i.e. to use an amalgam mixture in which there is a surplus of mercury, it being possible hereby to obtain a highly increased strength of the filling relatively to the usual "dry" method in which a smaller mercury proportion is used. For optimal results of using the wet method it is imperative that the amalgam is filled into the cavity in small portions which are consecutively compressed or condensed, and in practice this method, therefore, is not usable by manual filling since the filling will then take very long time to make. However, with the tool according to the invention it is possible to take advantage of the wet method and even obtain a shorter filling time as compared with the manual dry method.

Also in connection with the tool according to the invention it is possible to take advantage of using prefabricated cartridges containing the amalgam or other components, and as described below it will even be possible to dispense with the said special shaking apparatus since the cartridge may be shaken by means of a vibrator in the tool itself.

By way of example the invention is described in more detail in the following with reference to the accompanying drawing, in which:

FIG. 1 is a perspective view of an embodiment of a tool according to the invention, FIG 2 is a schematic perspective view of the interior of the tool, FIG. 3 a perspective view of a part thereof, FIGS. 4 and 5 are side views of a cartridge holder seen in two different positions, FIG. 6 is a side view of the front or dispensing end of the tool, seen partly in section, FIG. 7 is a sectional view of a cartridge for use in the tool, FIG. 8 is a side view partly in section showing the use of another type of cartridge, and FIG. 9 is a sectional view of still another cartridge.

The tool shown comprises a substantially cylindrical housing 2 which at the front end of the tool is provided with a bent outlet spout 4 adapted to be introduced into a tooth cavity. The tool is provided with a pivotable holder 6 for an amalgam cartridge 8. Inside the tool there is mounted a vibrator which is actuated by compressed air supplied through a flexible hose 10.

The tool will be described with its vertical orientation shown in the drawing, though of course it is not bound to be used in this position.

At its lower end the cartridge holder 6 is pivotally secured to a holder block 12 in which there is a recess 14 for receiving a cartridge 8 when the holder 6 is swung into the tool. The holder block 12 has a funnel shaped bottom portion 16, see also FIG. 3, which is adapted to receive a funnel shaped insert 18, the top side of which is made as a bowl portion 20 having a central opening 22 from which a channel extends downwardly to the lower narrow end of the funnel body 18. In FIG. 3 this body 18 is shown in a position lifted off from its position of use in which it is supported by the bottom portion 16. The amalgam cartridge 8 is adapted to rest against the bowl portion 20 with its lower end and to have an outlet opening communicating with the channel mouth 22, whereby the amalgam may pass down to a delivery area adjacent the lower end of the funnel body 18.

As shown most clearly in FIG. 6 the lower end of the funnel body 18 is situated immediately adjacent a side opening 24 in a channel 26 extending through the outlet spout 4. When seen from below the channel 26 extends further upwardly through a straight portion and thereafter through a curved portion 28 serving as a guiding channel for a Bowden-cable 30. At its lower end this cable is connected to a plunger 32 and at its upper end to a control block 34 which is connected with a piston rod 36 belonging to a pneumatic vibrator 38 which is operable to reciprocate the control block 34 between the top position shown in full lines and the bottom position shown in dotted lines, e.g. with a working frequency of 400-800 strokes per minute. By this movement the Bowden-cable 30 is correspondingly reciprocated through or in the channel 26, 28 and the plunger 32 is correspondingly moved between the retracted position shown in full lines in which the outer end thereof has just uncovered the side opening 24, and an advanced position in which the front end of the plunger is situated immediately adjacent the outer end of the outlet spout 4.

When the tool is in use amalgam may pass from the cartridge through the funnel body 18 to the channel 26, and the plunger 32 will thus press out the amalgam in small portions through the outlet spout and "beat" the portions into the tooth cavity.

As shown in FIG. 6 the control block 34 is shaped with a corrugated surface portion 40 which slides up and down a similarly corrugated rear surface of the holding block 12, whereby this block, which in a manner not shown is resiliently suspended in the tool housing, is influenced to carry out rapid vibrations which facilitate the delivery of amalgam from the cartridge 8 to the space 24.

The amalgam cartridge used is a standard cartridge which, however, is provided with a modified outlet end. As indicated in FIGS. 4–7 the cartridge is provided with a hood 9 which when pressed down causes an interior partition between an amount of mercury and an amount of filing to be broken, whereafter the contents can be mixed by thorough shaking. The breaking of the partition or seal between the said chambers may be done manually before the cartridge is placed in the holder 6 in the position shown in FIG. 4, or the holder 6 can be mounted in such a manner that when it is swung into an intermediate position as shown in FIG. 1 it will be pulled downwardly by cooperation between a boss 42 and a cam surface on the hub portion of the holder 6. The boss 42 cooperates with holding notches in this cam surface in such a manner that the holder 6 may be temporarily stabilized in any of the positions shown in FIGS. 4, 5 and 6. In the position shown in FIG. 5 in which the said partition is supposed to be broken the lower, convexly arched end of the cartridge is situated resting against the correspondingly arched surface of the bowl portion 20, as shown in FIG. 7. The cartridge has a lower outlet opening 24 which in this position is staggered relatively to the channel opening 22, i.e. the outlet opening 44 is closed by the said bowl surface.

In the intermediate position of the cartridge holder 6 shown in FIGS. 5 and 7 the cartridge is subjected to a relatively violent shaking by means of the vibrator 38. In order to obtain this there is provided suitable coupling means, e.g. actuated by a separate handle, for coupling together the control block 34 and the holding block 12. As an example FIG. 2 shows an arrangement by which this coupling together is obtained automatically when the holder 6 is swung outwardly from its position of use as shown in FIG. 6. On the lateral side of the holder block 12 there is mounted a horizontal guiding bushing 46 slidingly receiving a rod 48 which is biassed forwardly towards the holder 6 by means of the spring shown. At the rear end of the rod 48 there is mounted a hoop having a rear hoop portion 52 and an upright hoop portion 54. On the control block 34 there is mounted a side pin 56 projecting through the hoop 50. The vibrator 38 is so adapted that it is always stopped with its piston in the lowermost position, and the pin 56 is mounted at such a place that in the stop position of the control block 34 it is situated adjacent the horizontal hoop portion 52. When the holder 6 is entirely swung into the tool an edge portion of the holder will hold the rod 46 pushed rearwardly in such a manner that the pin 56 is situated immediately at the lower end of the upright hoop portion 54, but when the holder 6 is swung outwardly the rod 48 will be pressed resiliently forwardly, whereby the hoop portion 52 is moved into engagement with the pin 56. When thereafter the vibrator 38 is started the entire cartridge holder arrangement will be reciprocated in a shaking movement with the full working stroke length of the piston rod of the vibrator, since by the engagement between the hoop portion 52 and the pin 56 there is established a regular driving connection between the control block 34 and the holding block 12.

When the shaking and mixing has been completed the vibrator 38 is stopped and the holder 6 is swung inwardly to the position of use shown in FIG. 6. The corresponding position of the cartridge is shown in dotted lines in FIG. 7 from which it will be noted that the outlet opening 44 is now situated in flush with the channel opening 22. At the same time the hoop 50 is pressed back to the position in which the pin 56 is situated adjacent the lower end of the hoop portion 54, and when thereafter the vibrator 38 is started again the pin 56 will be able to move freely up and down in the hoop portion 54, whereby the holder block 12 is thereafter only subjected to the tiny vibrations produced by the sliding engagement between the corrugated surfaces of the members 34 and 12.

After the use of the tool the cartridge 8 is removed from the holder 6 in the swung out position thereof, and the funnel shaped insert body 18 is removed and thrown away, since it will normally be difficult to clean. Since the lower end of the funnel body 18 has been situated immediately above the channel 26 there will normally be no rest of amalgam left in the delivery end of the tool.

If necessary it will be possible to make use of further, special arrangements for facilitating the outflow of amalgam from the cartridge, e.g. an arrangement including a short hypodermic needle 60, FIGS. 5 and 6, puncturing the cartridge when this is swung to its position of use, the needle being connected to a source of compressed air such as the exhaust air from the vibrator 38, whereby there is created an overpressure inside the cartridge. Alternatively there may be provided means for pressing out the amalgam, e.g. as shown in FIG. 8 a pressure foot 62 mounted on the piston rod 64 of an air cylinder 66 and being operable to press on a piston or stopper 68 mounted slidably inside the cartridge as a part thereof. The cylinder system 66, 64, 62 could be replaced by a compression spring.

As shown in FIG. 9 there may be used a cartridge having a bendable outlet spout portion 70 substituting the funnel body 18 of FIGS. 3-7. The cartridge may be made generally of a bendable plastics material so as to be bellow-like deformable by a pressure from above, as in FIG. 8, or be compressible by a lateral pressure excerted e.g. by spring means 72 as shown in dotted lines in FIG. 9, when the cartridge is pressed or swung into its position of use in the tool. When the cartridge is made with an integral outlet spout portion 70, whether bendable or stiff, the outer end thereof may be adapted to be cut off after the shaking, or it may be closed by means of a diaphragm which can be perforated wither by a puncturing tool or by an overpressure created inside the cartridge in one of the manners mentioned above.

As a further possibility of forcing the amalgam or the like out of the amalgam container 8 it should be mentioned that as known in the art a flow in a desired direction can be promoted by means of vibrations either by making the vibrations nonuniform in their respective directions or by means of a suitable profilation of the surfaces along which the medium or substance is to flow. This, however, is a question of ordinary flow promotion techniques, and it is deemed unnecessary to describe these possibilities in more detail at this place, since it will be a matter of ordinary skill to adapt the device and if necessary the cartridge or container to this kind of flow promotion.

The invention is not limited to the use of prefabricated amalgam cartridges since it will be within the scope of the invention to use a special mixing chamber in which the components for the amalgam filling are individually introduced. e.g. after manual measuring of the required quantities. However, it would still be desirable to have the chamber mounted in a removable manner for cleaning purposes, so the cartridge 8 may as well represent an amalgam container adapted to be filled immediately prior to its use either with a ready mixed substance or with the components thereof. The tool might even be provided with supply chambers for the two components, respectively, and be provided with means for a continuous or discontinuous delivery of the components from these chambers and for continuously or discontinuously mixing the components and subsequently deliver the mixed substance to the delivery end of the tool. Such an arrangement is not illustrated in the drawings, because these dosing and mixing principles are already known in stationary mixing machines, and it would be a matter of skilled adaption only to provide the tool with an arrangement according to these principles.

However, it is preferred to use the said prefabricated cartridges, and the invention additionally comprises the cartridges which are specifically adapted for use in the tool, examples of such cartridges being shown in FIGS. 7, 8 and 9. The preferred embodiment shown in FIG. 7 includes the cartridge and the special funnel member 18, and of course the invention also comprises these parts as separate articles of manufacture. However, it will be within the scope of the invention to use the ordinary cartridges, the contents of which are mixed in a separate shaking machine, whereafter the cartridge in opened condition is inserted in the tool. Hereby the vibrator of the tool should not be dimensioned to also effect the mixing-shaking vibration, i.e. the releasable coupling between the vibrator and the container can be avoided.

If desired it will even be possible to use separate vibrators for the mixing-shaking, the compression vibration and the transport vibration of the filling substance, respectively. Obviously, the invention also comprises the use of tooth filling materials other than the material known under the technical term amalgam, this term being used here in a broad sense; obviously the amalgam dispenser tool according to the invention may be used in connection with substances other than amalgam.

What I claim is:

1. A dental implement for use in connection with filling of tooth cavities with a tooth filling material, comprising: a housing means, an outlet means provided on said housing means including an outlet spout provided with a central outlet passage having an outlet opening, a side opening provided in said outlet spout and communicating with said central outlet passage, a reciprocably mounted plunger means disposed in said central outlet passage, said plunger means being reciprocable between a retracted position uncovering said side opening and an advanced position covering said side opening, said plunger means including an outer end portion which is situated adjacent the outlet opening of said outlet passage when said plunger means is in said advanced position, a removable cartridge means for holding the tooth filling material, means mounted on said housing means for receiving said cartridge means, means disposed in said housing at said cartridge receiving means for holding said cartridge means therein, and a power driven vibrator means connected to said plunger means for reciprocating the same in said central outlet passage, a connector conduit means disposed between said cartridge means and said side opening for guiding the filling material from said container means to said outlet opening whereby the filling material is dispensed through the outlet opening into the cavity and compressed therein.

2. An implement according to claim 1, in which shaking coupling means are provided for releasably coupling together said cartridge means with said vibrator means to effect a mixing shaking of said cartridge means prior to actual use of the dental implement.

3. An implement according to claim 1, in which vibrator coupling means are provided for releasably coupling together the cartridge means with said vibrator means to subject said cartridge means to moderate vibrations of a frequency higher than the vibrating frequency of the vibrator means when the dental implement is in actual use.

4. An implement according to claim 3, in which said cartridge holding means includes a corrugated surface portion, and said vibrator coupling means includes a corrugated friction plate to impart to said cartridge means only vibrations resulting from the sliding of said corrugated surface portion and said corrugated friction plate relative to each other.

5. An implement according to claim 4, in which means are provided for producing an overpressure in said cartridge means.

6. An implement according to claim 5, in which said cartridge receiving means is pivotally mounted so as to be swingable between a projecting cartridge means receiving position in which the cartridge means can be laid into or taken out from the cartridge receiving means, and a closed position of use, and in which means are provided for opening said cartridge means in response to the swinging thereof to said closed position.

7. An implement according to claim 6, in which means connected to said cartridge receiving means and said cartridge holding means are provided for releasing the vibrator coupling means when the cartridge receiving means is swung into its position of use and for reestablishing the coupling of said vibrator coupling means when said container receiving means is swung outwardly towards said cartridge means receiving position.

8. An amalgam cartridge for use in a device according to claim 6, the cartridge containing an amount of filling and mercury or equivalent materials in mutually separated chambers which are openable towards each other by manipulation from outside, characterized in that the cartridge has an outlet opening provided in an arched end surface thereof, this surface being covered by a correspondingly arched surface of a generally funnel shaped element constituting said connector conduit means in which there is provided a channel, the channel is provided with an opening in said arched surface which opening is staggered relatively to the outlet opening of the cartridge when the cartridge is placed in said cartridge receiving means in the cartridge receiving position thereof, while the two said openings are brought to communicate when the cartridge is swung into said position of use.

9. An implement according to claim 1, wherein said connector conduit means includes a removable insert means disposed in said housing.

10. An implement according to claim 3, wherein said container holder means and said connector conduit means are both connected to said vibrator means.

11. An implement according to claim 3, in which shaking coupling means are provided for releasably shakably coupling said cartridge means with said vibrator means to enable said vibrator means to effect a mixing shaking of said cartridge means prior to use of the implement, and in which said cartridge receiving means is movable between a receiving position in which it is operable to receive said container, a shaking position in which it holds said cartridge means while shaking it, and an operative position in which it disposes said cartridge means in said cartridge holding means with said cartridge means in communication with said side opening, said cartridge receiving means being operatively connected with said shaking coupling means and said vibrator coupling means so as to make the shaking coupling means operative in said shaking position of said cartridge receiving means and said vibrator coupling means operative in said operative position of said cartridge receiving means.

12. An implement according to claim 11, in which said cartridge receiving means is pivotally mounted on said housing means so as to be swingable between a cartridge receiving position, in which said cartridge receiving means projects outwardly from said housing means, and a closed position in which an outer surface portion of said cartridge receiving means is substantially flush with the outer surface of said housing means.

13. An implement according to claim 1, in which said cartridge holder means is movable between a cartridge receiving position, in which it is operable to receive said connector conduit means and said cartridge means, and an operative position in which it holds said cartridge means in operative engagement with said connector conduit means, and in which means are provided for bringing an outlet opening of said cartridge means into operative engagement with said connector conduit means in response to said cartridge receiving means being moved into said operative position.

14. An implement according to claim 13, in which said cartridge means includes an actuator member operable to brake an internal partition between two components of the filling material provided in said cartridge means for allowing mixing of the components, and in which said cartridge receiving means is guided so as to cause actuation of said actuator member in response to said cartridge receiving means being moved from said cartridge receiving position towards said operative position.

15. An implement according to claim 13, in which injector means are provided for supplying compressed air to the interior of said cartridge means, said injector means being located so as to operatively engage said container means in response to said cartridge means being moved into its operative position by said container receiving means.

* * * * *